United States Patent
Bates et al.

(10) Patent No.: US 7,689,769 B2
(45) Date of Patent: *Mar. 30, 2010

(54) ARRANGING AND DESTAGING DATA TO HOLOGRAPHIC STORAGE

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 511 days.

This patent is subject to a terminal disclaimer.

(21) Appl. No.: 11/738,096

(22) Filed: Apr. 20, 2007

(65) Prior Publication Data

US 2008/0259765 A1    Oct. 23, 2008

(51) Int. Cl.
G06F 12/02 (2006.01)
G03H 1/00 (2006.01)

(52) U.S. Cl. .............. 711/117; 711/165; 365/125; 365/216; 365/235; 359/1

(58) Field of Classification Search .............. None
See application file for complete search history.

(56) References Cited

U.S. PATENT DOCUMENTS 5,675,780 A   10/1997  Plant-Mason et al. ....... 395/606
5,781,773 A    7/1998  Vanderpool et al. ......... 395/611
5,907,581 A *  5/1999  Ashley et al. ............... 375/242
6,041,334 A    3/2000  Cannon ....................... 707/204
6,868,177 B1 * 3/2005  Camahort et al. .......... 382/154
7,024,427 B2   4/2006  Bobbitt et al. .............. 707/200
2005/0097142 A1 5/2005 Best et al. ................... 707/200
2006/0221420 A1 10/2006 Itakura et al. ................ 359/22
2008/0056042 A1 3/2008 Leonhardt .................... 365/216

FOREIGN PATENT DOCUMENTS

JP    05-265825     10/1993
WO    02/082457    10/2002
WO    2006/010347   2/2006

OTHER PUBLICATIONS

Von J. Witte, Holographic Working Memories, Elektronische Rechenanlagen, 18 Jahrgang, 1976, pp. 214-219.

* cited by examiner

Primary Examiner—Jack A Lane
(74) Attorney, Agent, or Firm—John H. Holcombe

(57) ABSTRACT

Data for storage by holographic data storage is arranged in an intermediate data storage as data segments which are replicas of holographic storage segments. Files of data are aggregated into the data segments, and a destaging control determines the destaging of the data segments to the holographic data storage in accordance with a plurality of policies, such as whether a segment is full, a time threshold has been reached, or whether a threshold number of segments are "open". The intermediate data storage may be arranged into a number of partitions at least equal to the number of sources having input to the data destaging system, the partitions comprising integral multiples of the data segments.

5 Claims, 4 Drawing Sheets

ARRANGING AND DESTAGING DATA TO HOLOGRAPHIC STORAGE

CROSS REFERENCE TO RELATED APPLICATION

Commonly assigned US Application Serial No. (TUC920070009US1) filed on even data herewith relates to data destaging systems and computer program products configured to arrange and destage data to holographic storage.

FIELD OF THE INVENTION

This invention relates to holographic data storage, and, more particularly, to arranging data for storage by holographic data storage.

BACKGROUND OF THE INVENTION

Holographic storage comprises a high density data storage capability. Data is recorded into a holographic medium by employing a data beam that is two-dimensional in nature and comprises a rectangular image of a large number of bits arranged in a raster pattern. The data beam and a reference beam are separately directed to the holographic medium and intersect and interfere to form an interference wave font that is recorded as a holographic image known as a hologram into the holographic medium. Additional holograms may be recorded long linear tracks and at various depths of the holographic medium to provide a high capacity data storage.

SUMMARY OF THE INVENTION

Methods provide data for holographic data storage, and aggregate data into data segments for storage, for example, as holograms.

In one embodiment, a method for providing data for holographic data storage comprises the steps of arranging data for storage in intermediate data storage as data segments which are replicas of holographic storage segments; aggregating the data into the data segments; and determining destaging the data segments to the holographic data storage based on a plurality of policies.

Another embodiment additionally comprises the step of arranging the intermediate data storage into a number of partitions at least equal to the number of sources having input to the data destaging system, the partitions comprising integral multiples of the data segments.

Another embodiment additionally comprises the step of adding padding to a the data segment that is less than full and that the determining step determines to destage to the holographic data storage.

In a further embodiment, the determining step comprises determining the destaging of the data segments to the holographic data storage based upon one of (a) the aggregated data filling the data segment and (b) the data aggregation to at least the data segment occurring for a time at least meeting a threshold time period.

In another embodiment, the aggregating step comprises aggregating data into a plurality of "open" data segments, and the determining step comprises determining destaging at least one of the "open" data segments based upon one of (a) the aggregated data filling the "open" data segment and (b) to the number of "open" data segments at least meeting a threshold.

Another embodiment additionally comprises the steps of, if new data is provided for a designed data segment having padding, retrieving the data segment and storing the retrieved data segment in the intermediate data storage, appending the new data for overwriting the padding, and determining destaging the data segment to the holographic data storage.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
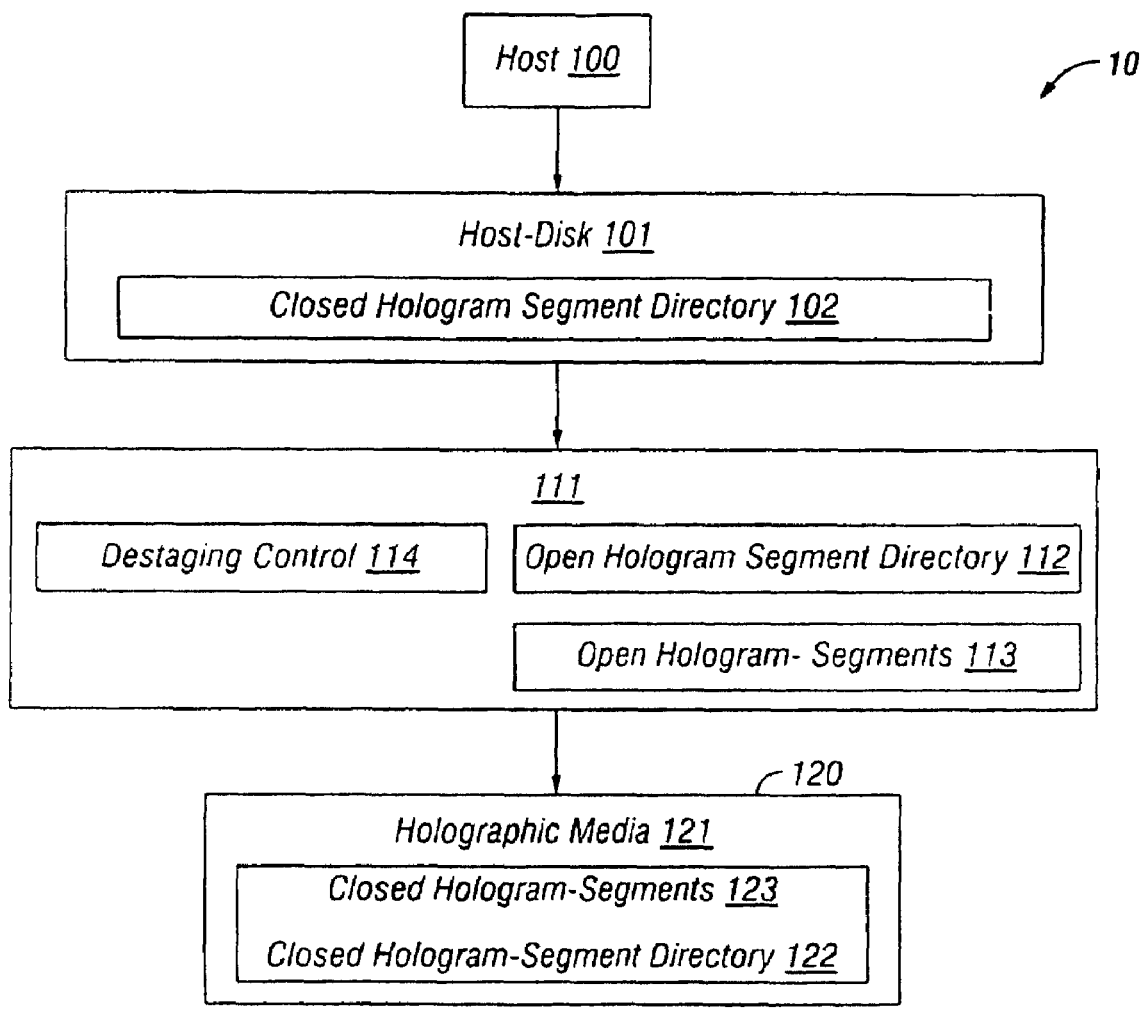
FIG. 1 is a block diagram illustrating an embodiment of a data destaging system for destaging data from a host to holographic media.

Referring to FIG. 1, an embodiment of a data destaging system 10 is illustrated that provides efficiency in storing data, for example, from host disk storage 101 of a host system 100, as holographic images 123 in a holographic media 121 of a holographic data storage 120.

Data for storage by the holographic data storage 120 is arranged in an intermediate data storage 111 as data segments 113 which are replicas of holographic storage segments, meaning that the data segments 113 are essentially an area of volatile memory, non volatile memory, or disk, of the same capacity or storage size as a hologram 123 stored on holographic media 121, or the same capacity or storage size as an integral number of hologram segments stored on the holographic media.

Files of data are aggregated into the data segments 113, which are called "open" segments. A destaging control 114 determines the destaging of the data segments to the holographic data storage in accordance with a plurality of policies, such as whether a segment is full, a time threshold has been reached, or whether a threshold number of segments are "open". When the data segments are destaged to holographic media 121, they become "closed" segments 123. The destaging control 114 may also conduct the aggregation of the files of data into the data segments 113.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc.

Furthermore, the invention can take the form of a computer program product accessible from a computer usable or computer readable medium providing program code for use by or in connection with a computer or any instruction execution system. For the purpose of this description, a computer usable or computer readable medium can be any apparatus that can contain, store, communication, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and a random access memory (RAM), a read-only memory (ROM), a rigid magnetic disk and an optical disk. Current examples of optical disks include compact disk-read only memory (CD-ROM), computer disk-read/write (CD-R/W), DVD, HD-DVD and Blu-Ray.

A data processing system, such as intermediate data storage 111, suitable for storing and/or executing program code, will include a least one processor, such as destaging control 114, coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the intermediate data storage 111 either directly or through intervening I/O controllers. Connections to and within the intermediate data storage 111 may encompass connection links including intervening private or public networks. The communication links may comprise serial interconnections, such as RS-232 or RS-422, Ethernet connection, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

The intermediate data storage 111 may be implemented as part of the holographic data storage 120 and/or the host system 100, or as a separate entity.

Files smaller than a holographic segment 123 are aggregated together and thus save space on the holographic media 121. The host system 100 may determine the basis for aggregation, for example maintained in memory by the host system 100. Aggregation may be made on the basis of similar transactions such as credit card transactions, a common user or set of users of the data, etc. The destaging control 114 maintains an open hologram segment directory 112 while the segments are being aggregated. Additionally, the destaging control tracks the segments until they are closed, as will be discussed.

Figure 2:
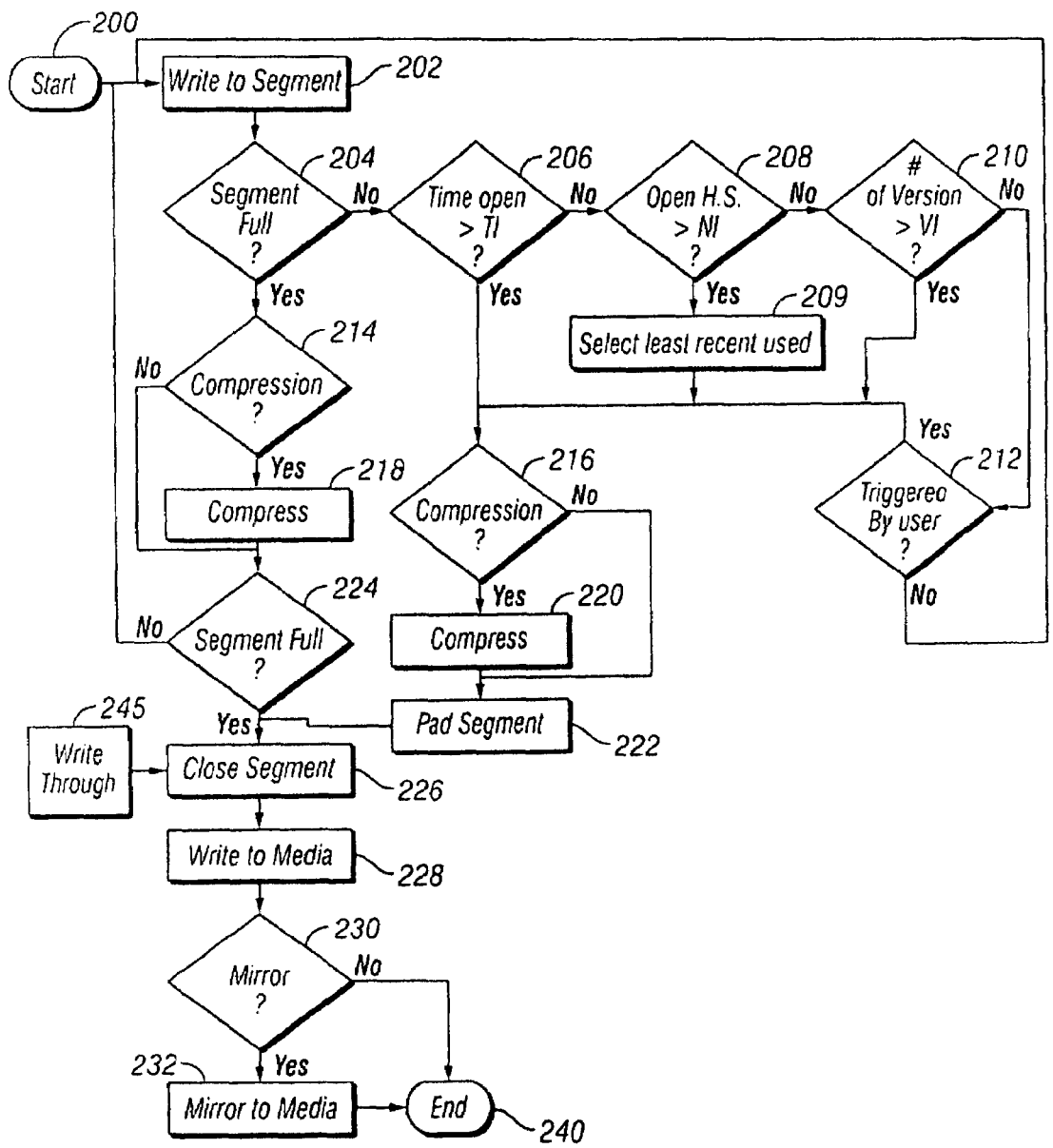
FIG. 2 is a flow chart depicting an embodiment of data destaging.

Referring additionally to FIG. 2, examples of policies for the process of determining destaging the data segments to the holographic data storage are illustrated. The destaging control 114 uses the policies to transition an open holographic segment 113 to a closed holographic segment and to destage the closed holographic segment 123 to the holographic media. The policies may be supplied by the user directly or via the host system and are stored by the destaging control 114. The process starts at step 200 and proceeds to step 202, where data being aggregated is written to an open holographic segment 113. The process continues with decision step 204, where a check is performed whether the holographic segment is full. A holographic segment might be full if the amount of data written to that segment exceeds a threshold. Examples of thresholds might be that the data has reached a percentage of the capacity of the segment, such as 10% remaining, or the threshold may be related to the average size of the data being aggregated, such as the remaining capacity is to be greater than the average size of the data being aggregated, for example to allow future updates; or the threshold may be an actual comparison, such as the next data to be aggregated exceeds the remaining capacity; etc.

If the segment is full, the process continues to step 214, where it checks whether to compress the data or not. This decision about compression might be based on a global user-configurable parameter to be true for all segments, or on a user-configurable parameter which is only true for this particular segment. If compression is desired, the data in the holographic segment is compressed in step 218. If no compression is desired, the process flows directly to step 224. In step 224, a check is made whether the segment is still full after compression. If not, then the process returns to step 202 allowing the writing of more data to the segment. If the segment is full in step 224, the process continues with step 226, which is explained below.

If, in step 204, the segment was not full, the process flows to step 206 checking if the segment or a set of segments has been opened for more than a time T1. Time T1 might be user-configurable. If the decision in step 206 is YES, the process flows to step 216, which is explained below.

If the decision in step 206 is NO, the process continues with step 208, where a check is made whether the number of open holographic segments in intermediate data storage 111 is greater than a user-configurable number N1. The number N1 might be closely related to the total capacity available in the intermediate data storage 111 and to the size of the holographic segments 113. More precise the number N1 might be computed as eqn. (1). In eqn. (1), B is a user configurable buffer-capacity parameter, to limit the number of open holographic segments to something less than the entire memory so that reserve capacity is available, if needed.

$$N1 = (\text{TotalCapacity})/(\text{SizeOfSegment}) - B \quad \text{(eqn. 1)}$$

If the decision in step 208 is YES, meaning that there are more than N1 open segments in the intermediate data storage 111, the process flows to step 208 where the open holographic segment is selected which has been least recent used (written). This segment is then subject to all further steps. From step 209 the process flows to step 216, which is explained later.

Further policies may exist to make the transition from open to closed segments, and destage the segments. For example, if the decision in step 208 is NO, the process continues with step 210, checking if the number of versions of the data files written to that segment is greater than a number V1. The number V1 might be user-configurable. If the decision in step 210 is YES, the process flows to step 216.

If the decision is NO, the process flows to step 212, checking whether segment closure has been triggered by the user. If that decision is NO, the process flows back to step 202, which allows the writing of more data to that open segment. Otherwise, the process flows to step 216, where a check is performed whether to compress the data in that segment or not. This decision about compression might be based on a global user-configurable parameter to be true for all segments or on a user-configurable parameter which is only true for this segment. If compression is desired, the data in the holograhgic segment is compressed in step 220, and the process continues with step 222. The compression technique of step 220 is preferably, but not necessarily, the same as that of step 218, and in step 220 new data may or may not be added to the data segment after compression. Alternatively, step 220 may be an ECC encoding technique and/or an encryption technique, or steps 216 and 220 may be omitted.

If no compression is desired, the process flows directly to step 222, where the remaining space in the holographic segment is filled with a pad-pattern to add padding to the segment, for example, to fill the segment. Optionally, the pad-pattern may comprise wholly or partially an ECC, or a CRC.

From step 222, the process flows to step 226. In step 226, the open holographic segment is closed, preventing additional data to be written to that segment. The process continues to step 228, where the data of the closed holographic segment is written to the holographic media 121 by the holographic storage 120. These steps are considered destaging the segment to the holographic media 121.

The process flows to step 230, where a decision may be made whether the data needs to be mirrored. This decision might be based on a global variable which is true for all segments or on a variable which is only true for a particular segment. If not data mirroring is desired in step 230, the process flows to the end step 240. Otherwise, if the decision in step 230 is YES, the data is mirrored to the holographic media in step 232. From step 232 the process flows to the ending step 240.

An additional policy may comprise is a write-through policy, whereby the host system instructs the intermediate data storage 111 to write the data through to the holographic media in step 245. This might be especially important for retention and compliance data. As an example of a write-through, the host system instructs the intermediate data storage 111 to write the coming data through via a SCSI MODE SELECT command. The host specifies the amount of upcoming data in bytes which shall be written through. When the data comes in from the host system 100 to the intermediate data storage 111, it is buffered in an open holographic segment 113. Once the specified amount of data is received, the open segment automatically transitions to a closed segment in step 226 resulting in a write of the data to the holographic media 121.

In an alternate embodiment of step 245, the host may use a MODE SELECT command to create an open segment 113 and a MODE SENSE command to close an open segment. This way the host system can control when (how quickly) an open segment is closed.

Figure 3:
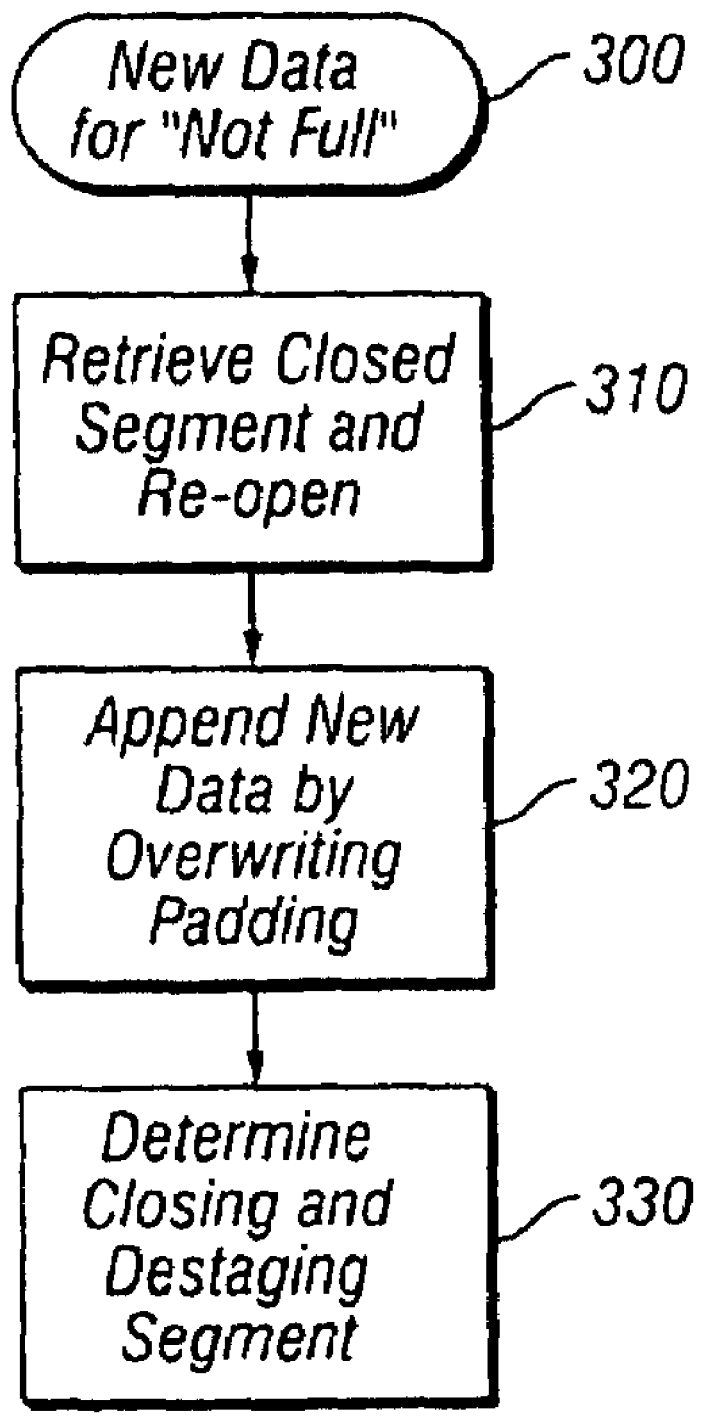
FIG. 3 is a flow chart depicting an embodiment of re-opening destaged data.

Referring additionally to FIG. 3, if new data arrives in step 300 for a "not full" but closed hologram segment, in step 310, that hologram segment is retrieved from the holographic media 121 and re-opened. The new data is appended to the hologram segment by overwriting the padding in step 320. The destaging control 114, in step 330, again conducts one or more of the steps of the process of FIG. 2 to determine closing and destaging the data segment to the holographic data storage. For example, hologram segment is then re-closed, if the segment is either filled with the new data or the maximum time is then re-closed, if the segment is either filled with the new data or the maximum time is exceeded again.

Re-opening a closed but not full segment might be valuable to the credit card industry, where each credit card user has an open segment for tracking his or her purchases for a given credit card. For example, the open segment is created at the beginning of each billing period or the first charge after the beginning of the billing period, and then closed at the end of the billing period.

Still referring to FIGS. 1 and 2, a more detailed discussion of the policies of the destaging control 114 or host system 100 provided in the flow diagram is as follows:

For policy (a) of step 204 the threshold capacity for closing a hologram-segment is user configuration. If the threshold capacity is exceeded, the hologram segment is closed and written to the holographic media. This threshold capacity may be specified in MD, GB, or in "holographic pages." The threshold of holographic pages is preferred, where each holographic page holds a predefined capacity and an integral number of pages is specified as the threshold.

Policy (b) of step 214 allows the optimal selection of compression. A variant of policy (e) is that data in an open hologram segment is not compressed until that segment reaches a capacity threshold, such as 90% filled. Once that threshold has been reached, data is compressed on-demand, in order to make room for additional data. This policy is designed to mitigate the amount of padding used in policy (a).

For policy (c) of step 206, the maximum time that a hologram-segment can be left open, may be user configurable. The hologram-segment open time starts when the first data is written. If the maximum time is not exceeded, but the hologram segment is full (step 204), the hologram-segment is closed and written to the holographic media.

If the maximum time is exceeded and the hologram-segment is not filled up to the segment capacity-limit, the rest of a space is padded and filled with a pad-pattern (in other words, a non-data pattern) in step 222, and then the hologram-segment is closed and written to the holographic media. Any hologram segment with a pad-pattern is marked "not full" in closed hologram segment directories 102 and 123. In one alternate embodiment the non-data pattern used for padding can also comprise some CRC or ECC data which adds additional protection to the data in the hologram segment.

For policy (d) of step 212, the user can issue (in other words, force) a close of a hologram segment. If the hologram segment is not full, our preferred embodiment applies the same logic as for policy (a) where the remaining space is padded and new data causes a retrieval of the segment and append of the new data over the pad-pattern. This force-closure of hologram-segments might be in response to a power outage or impending disaster, such as fire or hurricane.

Policy (e) of step 208 is a variant of policy (d). In Policy (e), only so many open hologram segments are permitted. When too many open hologram segments exist, the least recently used (LRU) segments are closed first, as needed, to allow the creation of new holographic segments. Alternately, too many open hologram segments triggers an aggregation of many open hologram segments into fewer segments.

Policy (f) of step 210 is that all versions of a given data file are stored in an open-hologram segment. This storage of versions allows a complete historical record of changes made to valuable files. Thus, policy (f) is a logical form of holographic WORM, where versions of files are saved rather than overwritten. The advantage of policy (f) is that all versions are stored in a common location, so that the user does not have to engage in multiple accesses of the holographic media to retrieve those versions.

Policy (g) of step 230 is that files may be mirrored (duplicated) between open hologram-segments, for a RAID-1 emulation. This way, if one closed hologram-segment cannot be read from the holographic media, a different hologram segment can be accessed. Another example of mirroring is that three or more hologram segments may be spread into RAID stripes, with parity stored in one hologram segment for a RAID-3 or -4 emulation, or parity spread across the hologram segments for a RAID-5 emulation.

In steps 228 and/or 232, the intermediate data storage 111 writes the closed segment out to the holographic media 121 as a single hologram or single-group of holograms, generates or adds information to a closed hologram-segment director 122 and transfers the newly closed hologram directory to the host 100 where it is used to update the overall hologram-directory 102, which may be stored on the host disk 101. At this point, the intermediate data storage 111 ceases to retain any information about the hologram-segment that has just been closed.

The "Open Hologram-Segment Directory" 112 is maintained in the intermediate data storage 111 for each open hologram-segment 113. This records which files are stored where in the open segment 113. When the open segment 113 is closed, the hologram-segment directory 112 is replicated and embedded within the closed Hologram-Segment on the intermediate disk storage 111, for storage on the holographic media 121 as directory 122. Additionally, hologram-segment directory 112 is replicated as closed hologram segment directory 102 on host disk 101 so that the host 100 has available when information it has stored on holographic media 121. A media directory may be maintained on the holographic media, and contains all information necessary of the destaging control or data storage 120 to control the placement of closed segments 123 on media 121, if that media is removable from the holographic data storage.

Although the policies could be executed at the host 100 level, a preferred embodiment is that the policies are executed at the intermediate data storage 111 level, so that the host is not burdened by the process, and so that the holographic storage 120 can be cost-reduced by not requiring this intelligence.

Figure 4:
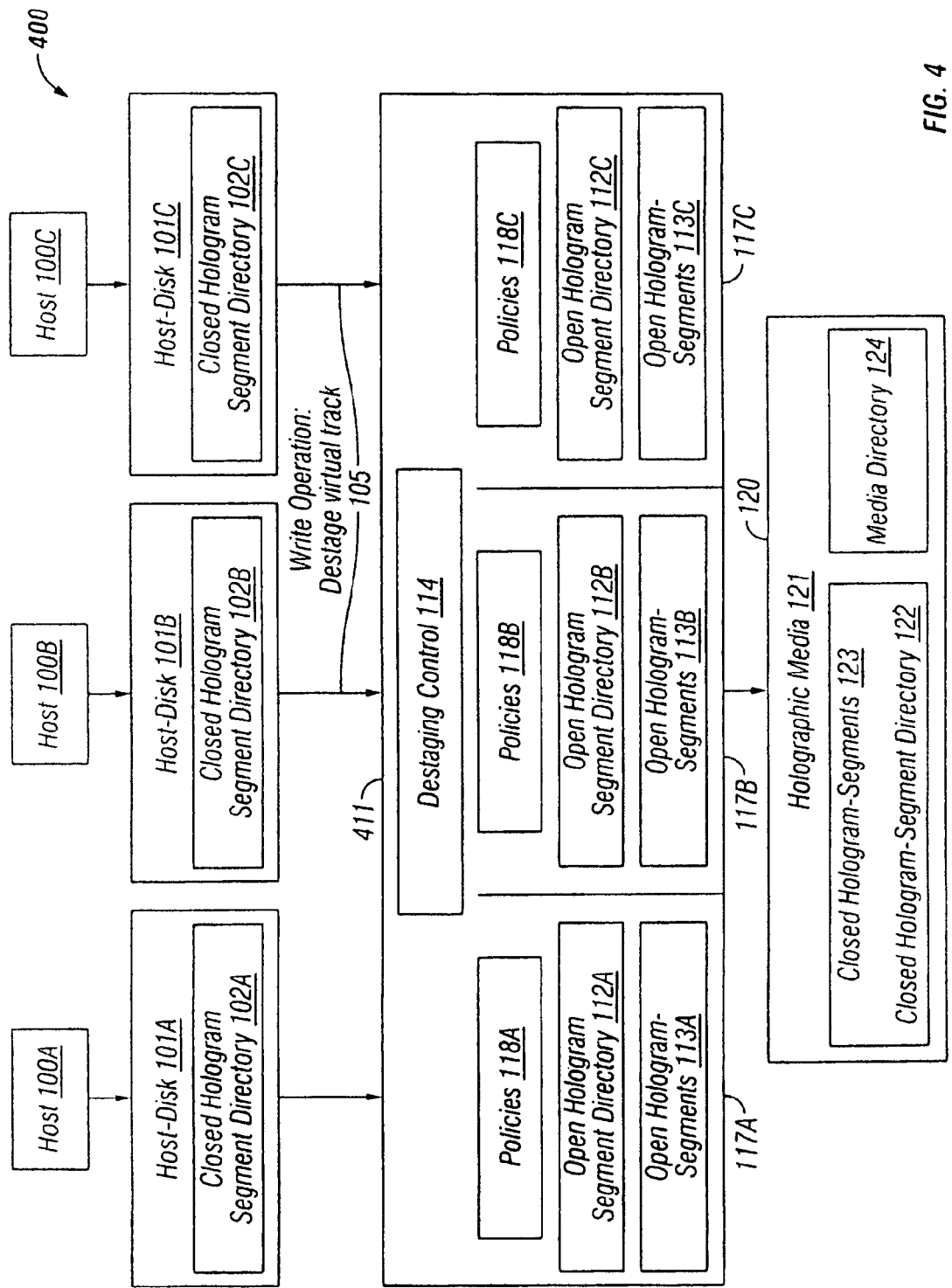
FIG. 4 is a diagrammatic illustration of partitions of a data destaging system for destaging data from a plurality of hosts to holographic media.

FIG. 4 illustrates partitions of a data destaging system 400 for destaging data from a plurality of hosts 100A, 100B and 100C to holographic media 121.

The intermediate data storage 411 is similar to intermediate data storage 111 of FIG. 1 and maintains a number of open hologram-segments 113A, 113B and 113C in each partition 117A, 117B and 117C. The number of partitions is at least equal to the number of sources or hosts having input to the data destaging system 400. As discussed above, hologram segments 113A, 113B, 113C are replicas of holographic storage segments, meaning that the data segments 113 are essentially an area of volatile memory, non volatile memory, or disk, the same capacity or storage size as a hologram 123 stored on holographic media 121, or the same capacity or storage size as an integral number of hologram segments stored on the holographic media. A partition 117A, 117B and 117C comprise integral multiples of the data segments. The partitions may be of differing sizes, and a host may have one or more partitions, for example, for different applications. Alternatively, hosts 100A, 100B and 100C may comprise different applications of the same host system.

Data is written by each host 110A, 100B, 100C using, for example "destage virtual track" operations 105 to the respective partition 117A, 117B, 117C on intermediate data storage 411. The "destage virtual track" operation can be a SCSI write command, and iSCSI command, a GbEN command, or any other operation sending data from a host system 100A, 100B, 100C to the appropriate partition 117A, 117B, 117C of the intermediate data storage 411. The host systems 100A, 100B, 100C and the intermediate data storage 411 may be in communications across a network, such a Storage Area Network.

The destaging control 114 may employ separate policies 118A, 118B, 118C for each of the hosts 100A, 100B, 100C. The policies are supplied by the separate hosts and stored by the destaging control 114. The policies 118A, 118B, 118C are shown as associated with the particular partitions, but are stored in the memory of the destaging control and not with the segments 113A, 113B, 113C. Depending on the policies, which may be user selected, the destaging control determines the destaging for the host in accordance with the selected policies depicted in FIGS. 2 and 3, as discussed above.

An "Open Hologram-Segment Directory" 112A, 112B, 112C is maintained in each partition 117A, 117B, 117C of the intermediate data storage 411 for each open hologram-segment 113A, 113B, 113C. This records which files are stored where in the open segment 113A, 113B, 113C. When the open segment 113A, 113B, 113C is closed, the hologram-segment directories 112A, 112B, 112C are replicated and embedded within the closed Hologram-Segment on the intermediate data storage 411, for storage on the holographic media 121 as closed directory 122. Additionally, hologram-segment director 112A is replicated as closed hologram segment directory 102A on host disk 101A, hologram-segment directory 112B is replicated as closed hologram segment directory 102B on host disk 101B, and hologram-segment directory 112C is replicated as closed hologram segment directory 102A on host disk 101A, hologram-segment directory 112B is replicated as closed hologram segment directory 102B on host disk 101B, and hologram-segment directory 112C is replicated as closed hologram segment directory 102C on host disk 101C, so that hosts 100A, 100B, 100C know what information each has stored on holographic media 121. A media directory 124 may be maintained on the holographic media, and contains all information necessary for the destaging control or data storage 120 to control the placement of closed segments 123 on media 121, if the media is removable from the holographic data storage.

Although the policies 118A, 118B, 118C could be executed at the host 100A, 100B, 100C level, a preferred embodiment is that the policies 118A, 118B, 118C are executed with respect to each partition 117A, 117B, 117C at the intermediate data storage 411 level, so that the host is not burdened by the process, and so that the holographic storage 120 can be cost-reduced by not requiring this intelligence.

Those of skill in the art will understand that changes may be made with respect to the methods discussed above, including changes to the ordering of the steps. One or more of the policy step may be omitted, or others may be added. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for providing data for holographic data storage comprising the steps of:
    arranging data for storage in intermediate data storage as data segments which are replicas of holographic storage segments;
    aggregating said data into said data segments; and
    determining destaging said data segments to said holographic data storage based on a plurality of policies wherein said determining step comprises determining said destaging of said data segments to said holographic data storage based upon one of (a) said aggregated data filling said data segment and (b) said data aggregation to at least said data segment occurring for a time at least meeting a threshold time period.

2. The method of claim 1, additionally comprising the step of arranging said intermediate date storage into a number of partitions at least equal to the number of sources having input to said data destaging system, said partitions comprising integral multiples of said data segments.

3. The method of claim 1, additionally comprising the step of adding padding to a said data segment that is less than full and that said determining step determines to destage to said holographic data storage.

4. The method of claim 3, wherein said aggregating step comprises aggregating data into a plurality of "open" said data segments, and said determining step comprises determining destaging at least one of said "open" data segments based upon one of (a) said aggregated data filling said "open" data segment and (b) the number of "open" said data segments at least meeting a threshold.

5. The method of claim 3, additionally comprising the steps of, if new data is provided for a destaged data segment having said padding, retrieving said data segment and storing said retrieved data segment in said intermediate data storage, appending said new data by overwriting said padding, and determining destaging said data segment to said holographic data storage.

* * * * *